(12) United States Patent
Yee et al.

(10) Patent No.: US 7,453,419 B2
(45) Date of Patent: Nov. 18, 2008

(54) EDGE LIGHTING SYSTEM FOR INTERACTIVE DISPLAY SURFACE

(75) Inventors: Dawson Yee, Clyde Hill, WA (US); Thomas D. Mehlhaff, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 10/997,640

(22) Filed: Nov. 24, 2004

(65) Prior Publication Data
US 2006/0109199 A1    May 25, 2006

(51) Int. Cl.
*G01D 11/28* (2006.01)
(52) U.S. Cl. .............................. 345/39; 345/36; 345/46; 345/84; 345/903; 362/31; 362/65; 362/68
(58) Field of Classification Search ............. 345/36, 345/39, 46, 48, 84, 903; 362/31, 65, 68
See application file for complete search history.

(56) References Cited
U.S. PATENT DOCUMENTS

| | | | |
|---|---|---|---|
| 4,949,489 A * | 8/1990 | Rudell et al. .................. 40/546 |
| 6,036,328 A * | 3/2000 | Ohtsuki et al. .............. 362/612 |
| 6,152,569 A * | 11/2000 | Aizawa ......................... 362/27 |
| 2002/0074559 A1* | 6/2002 | Dowling et al. ................ 257/99 |
| 2002/0126478 A1* | 9/2002 | Cornelissen et al. ........ 362/228 |
| 2002/0163791 A1* | 11/2002 | Hoelen et al. .................. 362/31 |
| 2003/0089919 A1* | 5/2003 | Ishii et al. .................... 257/100 |

FOREIGN PATENT DOCUMENTS
WO    WO 04/001492    12/2003

* cited by examiner

*Primary Examiner*—Bipin Shalwala
*Assistant Examiner*—Vince E Kovalick
(74) *Attorney, Agent, or Firm*—Workman Nydegger

(57) ABSTRACT

An edge lighting system has a plurality of light sources, such as light emitting diodes (LEDs) mounted at spaced-apart intervals along a rail that is disposed adjacent to an edge of a display surface. Orifices formed in the rail in which the light sources are inserted are sized to enable each light source to move freely into contact with the edge of the display surface when urged by a force provided by a compressed elastomeric member to provide a uniform illumination as the light is internally reflected in the material comprising the display surface. The light sources extend beyond a concave (parabolic) surface on the rail that reflects light from the light sources into the edge. Any object approaching the display surface is illuminated by the light being conveyed within the material.

26 Claims, 6 Drawing Sheets

EDGE LIGHTING SYSTEM FOR INTERACTIVE DISPLAY SURFACE

FIELD OF THE INVENTION

This invention generally pertains to an edge lighting system for a surface, and more specifically, to a system and method for illuminating objects placed on a surface with non-visible light emitted by a plurality of light sources arrayed along one or more edges of the surface.

BACKGROUND OF THE INVENTION

A user usually interacts with entities in a virtual environment by manipulating a mouse, joystick, wheel, game pad, track ball, or other user input device that causes a virtual entity to move in a specific manner or carry out some other action or function as defined by the software program that produces the virtual environment. The effects of a user's interaction with an entity in the virtual environment are generally visible on a display. For example, a user might use a conventional input device to provide the user input for controlling a virtual entity such as a spaceship or race car that is displayed in the game or virtual environment.

Another form of user input employs displays that are responsive to the touch of a user's finger or a stylus. Touch responsive displays can be pressure activated, responsive to electrical capacitance, changes in magnetic field intensity, employ surface acoustic waves, or respond to other variables that indicate the location of a finger or stylus on the display. Another type of touch sensitive display includes a plurality of optical sensors spaced-apart around the periphery of the display screen so that the location of a finger or stylus touching the screen can be detected. Using one of these touch sensitive displays, a user can more directly control a virtual entity or image that is displayed. For example, the user may touch the displayed virtual entity to select it and then drag the entity to a new position on the touch-sensitive display, or touch a control and drag the control to change some parameter.

However, in most such touch-sensitive displays, the response is only to the touch of the finger or stylus at a point. There is another type of interaction with a virtual environment that might provide a much richer experience for the user. While virtual environments produced, for example, by electronic game software programs often include virtual entities that are displayed on a screen, it would be desirable for the virtual environment to also respond to physical objects that are placed on the display surface. In most prior art touch-sensitive displays, the finger or stylus is treated simply as an alternative type of pointing device used to make selections or drag elements about on the screen. To be truly interactive in responding to physical objects that are placed on it, a display surface should also be able to detect where one or more physical objects are positioned on the surface, as well as be able to detect different types of physical objects placed on the surface, where each object might provide a different interactive experience for the user. However, the capacitive, electromagnetic, optical, or other types of sensors used in conventional touch-sensitive displays typically cannot simultaneously detect the location of more than one finger or object touching the display screen at a time, and thus, would be unable to detect the location or each different type of a plurality of different types of physical objects placed thereon. These prior art touch-sensing systems are generally incapable of detecting more than a point of contact and are unable to detect the shape of an object proximate to or touching the display surface. Even capacitive or resistive, or acoustic surface wave sensing display surfaces that can detect multiple points of contact are unable to image objects placed on a display surface to any reasonable degree of resolution (detail), and most require expensive or relatively complicated coding schemes, than a more desirable simple bar code. Prior art systems of these types cannot detect patterns on an object or detailed shapes that might be used to identify each object among a plurality of different objects that are placed on a display surface.

Another user interface approach that has been developed in the prior art uses cameras mounted to the side and above a horizontal display screen to visually capture an image of a user's finger or other objects that are touching the display screen. This multiple camera mounting configuration is clearly not a compact system that most people would want to use in a residential setting. In addition, the accuracy of this type of multi-camera system in responding to an object that is on or proximate to the display surface depends upon the capability of the software used with the system to visually recognize objects and their location in three-dimensional space. Furthermore, the view of one object by one of the cameras may be blocked by an intervening object. Also it is difficult to deduce if a finger or object has touched the screen, and such a vision sensing system often requires an involved calibration. From an aesthetic viewpoint, objects usable in such a system will not be pleasing to a user because they will need a code that is most likely visible to the user on top of the object, and thus, the manner in which the object is being detected will be clearly evident to the user.

To address many of the problems inherent in the types of touch-sensitive displays discussed above, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14-17. The metaDESK includes a near-horizontal graphical surface used to display two-dimensional geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect passive objects called "phicons" that are placed on the graphical surface. For example, in response to the IR camera detecting an IR marking applied to the bottom of a "Great Dome phicon," a map of the MIT campus is displayed on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user.

A similar approach to sensing objects on a display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. The objects thus detected can be a user's fingers or hands, or other objects.

Each of the prior art interactive surfaces that use IR light to detect objects that are in contact with or proximate to a display surface employ IR light sources that are disposed apart from the surface and which direct IR light toward the surface from a side of the display surface that is opposite to that on which the objects are placed on or proximate. A problem with this approach is that the IR light illuminating the objects is not as uniform as would be desired. Even if an array of IR light sources is used as a source, the IR light passing through the surface and being reflected back by any object that is proximate to the other side of the surface is substantially different in intensity at different points on the surface. Accordingly, it would be desirable to develop a more uniform source of IR light to illuminate objects placed on or proximate to a display surface to enable the objects and any desired optical properties of the objects to more effectively be detected, based upon the reflected IR light that is received by an IR responsive camera or other suitable light detector. Since it is also possible to use other wavebands of light that are non-visible for this application, the same approach should be usable with other wavebands of light, such as ultraviolet (UV) light, or even visible light.

One approach that has been used for uniformly illuminating text on a surface of a sheet of plastic employs edge lighting. For example, emergency exit signs often use a sheet of acrylic plastic that is specially fabricated to conduct light from an edge throughout the sheet using internal reflections and are designed specifically to allow light to escape through the surfaces in a uniform fashion. Any non-opaque object in front or behind the acrylic plastic is effectively illuminated by a sheet light source. The visible light source has typically been either a fluorescent tube, or surface-mounted light emitting diodes (LEDs). The light source is placed at one edge of the acrylic sheet. To provide optimum light transfer from the light source into the acrylic sheet, the light source should be in contact with the edge of the sheet. One problem with the prior art approach of using surface mounted LEDs is that it is difficult to ensure all of the LEDs that are surface mounted on a printed circuit board strip remain in direct contact with the edge of the acrylic sheet. At least some of the LEDs that are surface mounted can easily fail to contact the edge of the sheet, resulting in non-uniform lighting of the text applied to the surface of the acrylic sheet. While contact between a fluorescent tube and the edge of the acrylic sheet is easier to maintain, fluorescent tubes emit visible light, but none are available that emit only IR light, without any visible light. Accordingly, it would be desirable to provide an edge lighting system and method that ensures each of the light sources that emit a desired waveband of light remains in contact with the edge of the acrylic sheet.

SUMMARY OF THE INVENTION

An edge lighting system was developed to address the problems with using one or even a plurality of light sources (e.g., in an array) to illuminate objects that are proximate to or in contact with an interactive display surface. While the edge lighting system that was developed is particularly applicable to providing IR illumination of objects that are proximate to or in contact with the interactive display table, it clearly has other applications and has been found to be much more efficient than prior art systems in providing even illumination of a surface, because of the light sources being biased individually into contact with the edge of the display, in contrast to surface mounted LEDs wherein some of the LEDs are often not in contact with the edge of the display, or require the use of coupling fluids, gels, or oils.

One aspect of this invention is therefore directed to an edge lighting system that includes a plurality of light sources electrically coupled into an electric circuit so that the light sources can be energized with an electrical current. Also included is an elongate support having a plurality of orifices formed therein at spaced-apart locations along a length of the support. Each of the plurality of orifices is sized to receive and support one of the plurality of light sources, to define a generally linear array. Each of the light sources is inserted through one of the orifices and is free to move within the orifice. A front portion of each light source extends outwardly from the elongate support. An elastomeric member is disposed behind a rear portion of the light sources and provides a force directed against the rear portion. Since light sources are free to move within the orifice, they are thus biased, so that the front portion of each light source optimally contacts an edge into which the light emitted by the light source is directed.

Preferably, the plurality of light sources comprise a plurality of light emitting diodes (LEDs), although other types of light sources might instead be used. In one application, the LEDs each emit a non-visible light, i.e., either in an infrared (IR) light waveband or in an ultraviolet (UV) light waveband.

Although not required, the elongate support can beneficially include a concave curved surface, so that the front portion of each of the plurality of light sources extends, beyond the concave curved surface. This curved surface then reflects light emitted by the plurality of light sources into the edge that is contacted by the front portion of each of the light sources.

In one configuration, the plurality of orifices are spaced more closely together along at least one portion of the elongate support than along at least another portion of the elongate support. For example, near the ends of the elongate support, it may be preferable to space the light sources more closely together.

The elastomeric member of one embodiment comprises an elongate strip of elastomeric material that extends along the length of the elongate support member and is disposed between an adjacent surface and the rear portion of the plurality of light sources. This elastomeric material is compressed in this configuration so that it develops the force that optimally biases each of the plurality of light sources toward the edge into which the light emitted by the light source is directed.

Another aspect of the present invention is directed to a method for lighting an edge of a light conductive sheet. The method includes the steps of mounting a plurality of light sources in an elongate support so that each of the plurality of light sources is free to move toward the edge relative to the support, and so that the plurality of light sources is disposed to emit light directed into the edge of the light conductive sheet. Each of the plurality of light sources is then biased, so that each light source is separately urged to move toward and into contact with the edge of the light conductive sheet. The plurality of light sources are then enabled to be energized so they emit light that is directed into the edge of the light conductive sheet. Other steps of the method are generally consistent with the functions performed by the elements of the edge lighting strip discussed above.

BRIEF DESCRIPTION OF THE DRAWINGS FIGURES

The foregoing aspects and many of the attendant advantages of this invention will become more readily appreciated as the same becomes better understood by reference to the following detailed description, when taken in conjunction with the accompanying drawings, wherein.

Figure 7A:
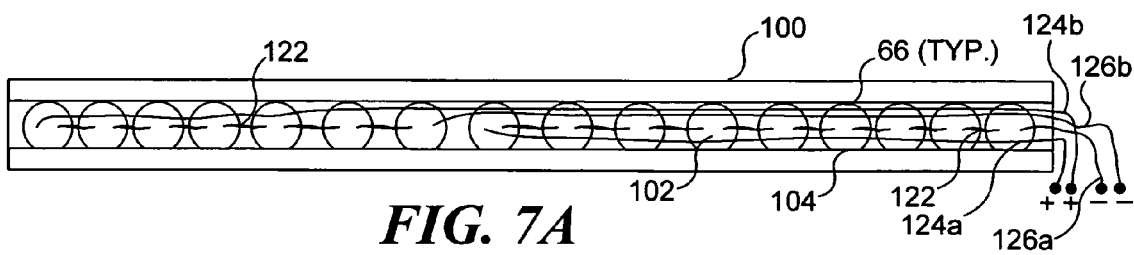
Figure 7B:
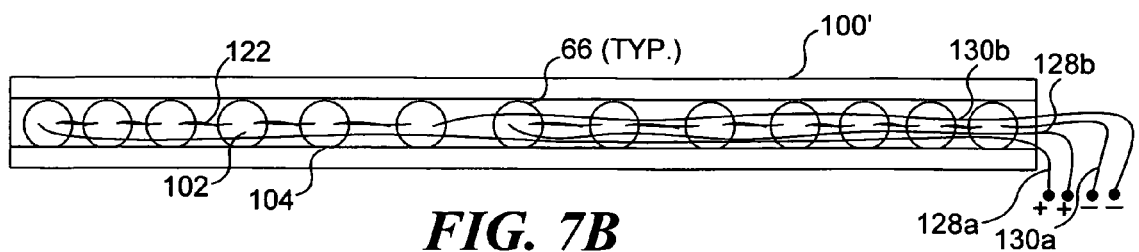
Figure 8:
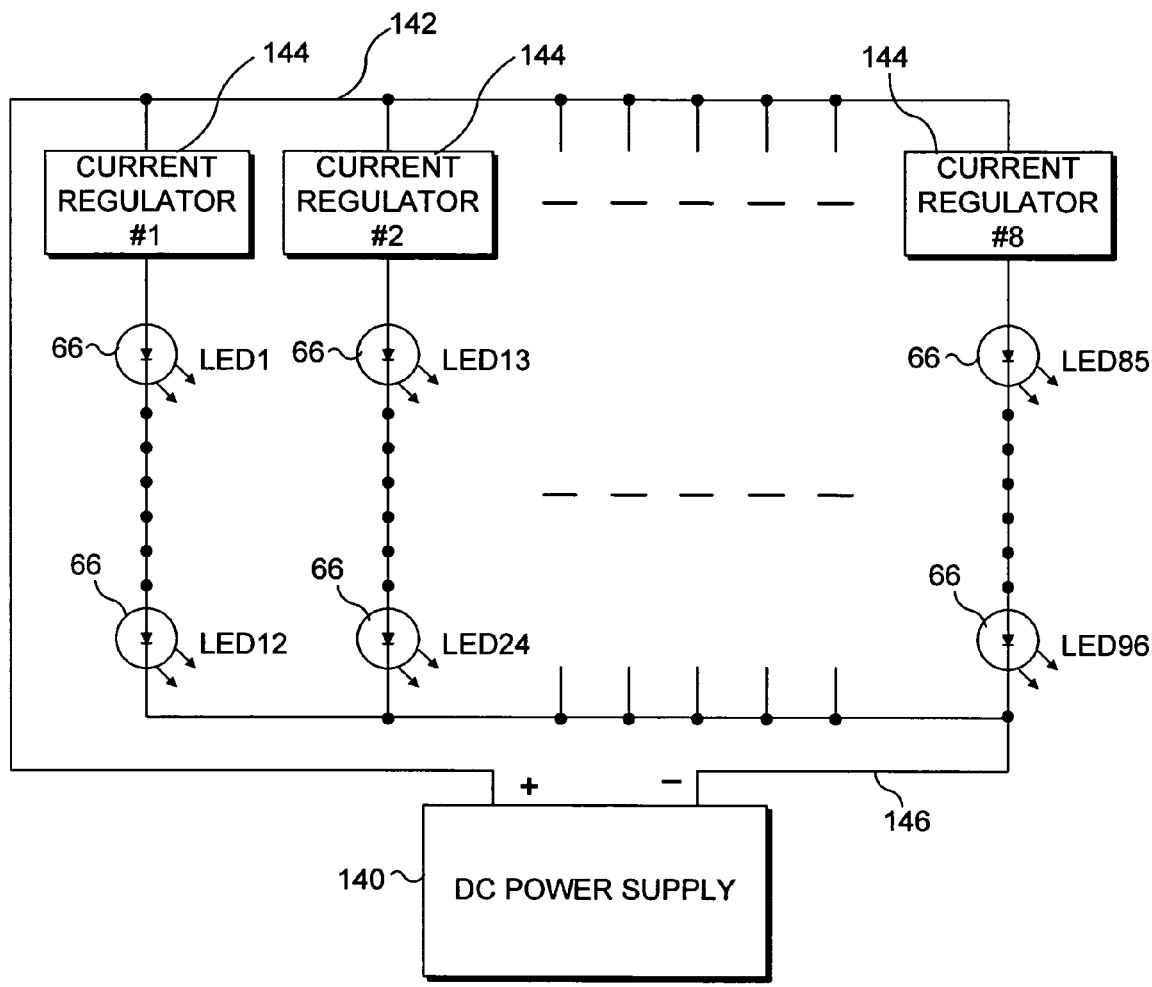

FIGS. 7A and 7B are rear elevational views of two edge lighting rails, showing the series/parallel wiring arrangement for an exemplary embodiment in which a different number of LEDs are used for the first and second edge lighting rails, which are installed at opposite edges of a display surface, and illustrating the different spacing between the LEDs on the two edge lighting rails; and FIG. 8 is an electrical schematic diagram illustrating a series/parallel interconnection of the LEDs used for one preferred embodiment of the present invention.

DESCRIPTION OF THE PREFERRED EMBODIMENT

Exemplary Computing System for Implementing Present Invention

Figure 1:
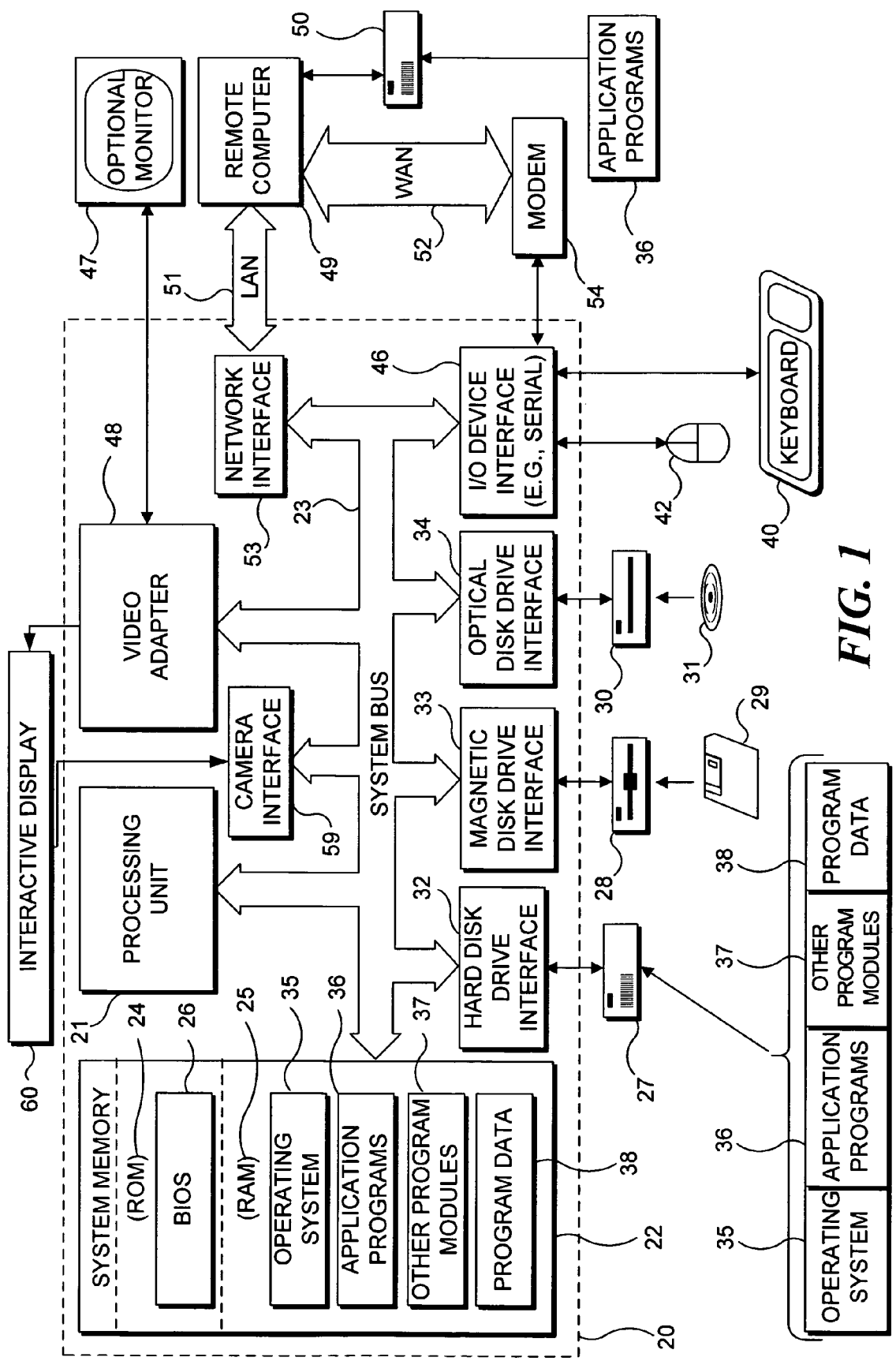
FIG. 1 is a functional block diagram of a generally conventional personal computer (PC) that is suitable for processing the input and output data used in practicing the present invention.

With reference to FIG. 1, an exemplary system suitable that might be used with the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will appreciated that the network connections shown are exemplary, and other means of establishing a communications link between the computers may be used, such as wireless communication and wide band network links.

Exemplary Interactive Surface

Figure 2:
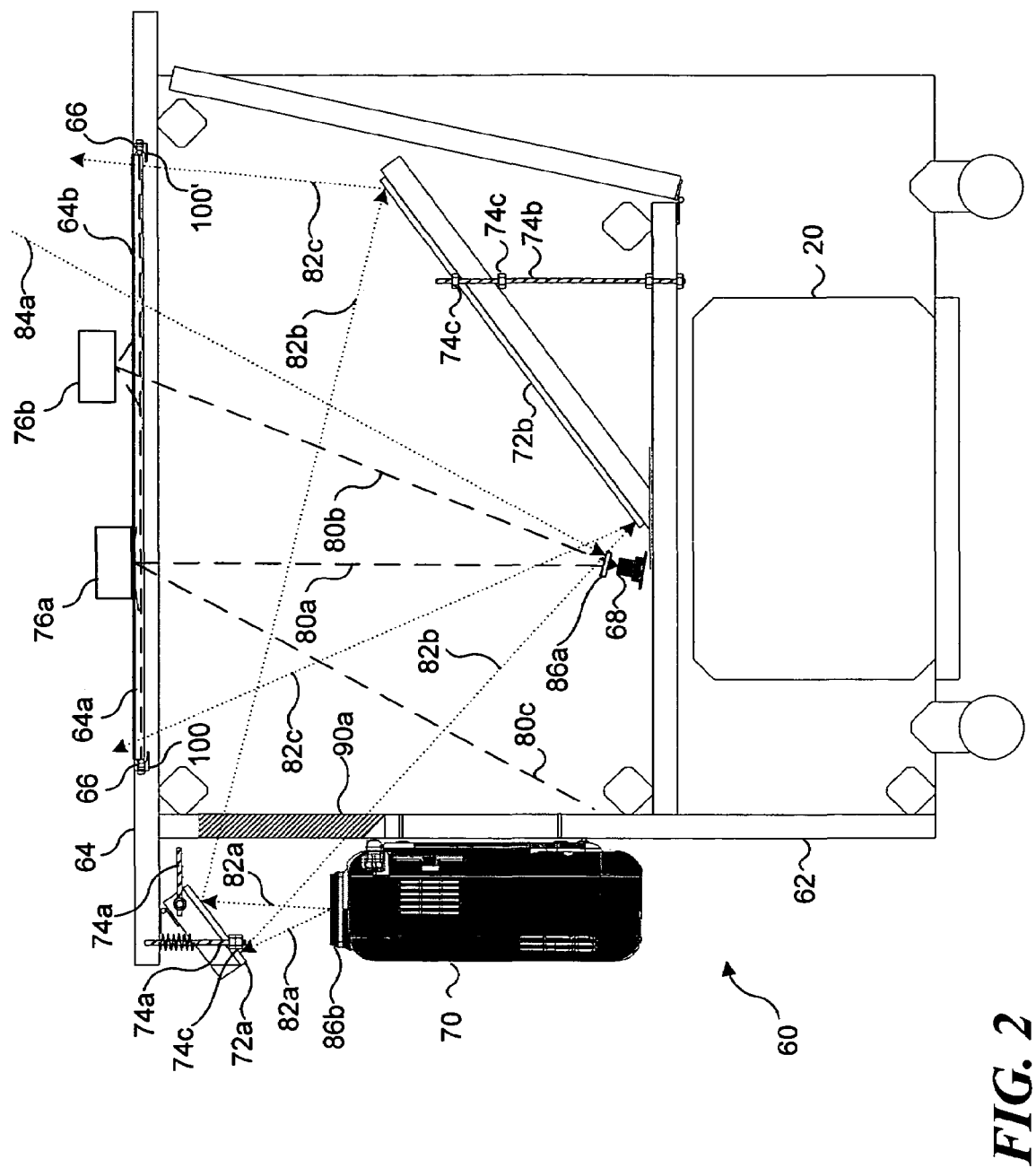
FIG. 2 is an illustration of the interior of the interactive table showing hardware components of the interactive table, the paths followed by light within the interactive table, and exemplary objects disposed on and above the surface of the table.

In FIG. 2, an exemplary interactive display 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or vitual environment being displayed on display surface 64a.

A plurality of IR light sources 66 preferably comprising IR LEDs are mounted within edge lighting rails 100 and 100' and disposed along opposite edges of display surface 64a. Although only one IR source 66 is shown on each edge lighting rail in this Figure, it will be appreciated that a plurality of such IR sources are preferably mounted at spaced-apart locations along each edge lighting rail to provide a very even illumination of display surface 64a. The IR light that is produced by IR light sources 66 is internally reflected within display surface 64a and is then uniformly emitted through the surfaces. Accordingly, a translucent layer 64b comprising a sheet of vellum or other suitable translucent material with light diffusing properties is optionally provided on the top of display surface 64a. Any object such as a hover object 76b, or a "touch" object 76a will be illuminated with the IR light that is emitted from the display surface 64a Thus, the IR light from IR light sources 66 is reflected from any objects that are atop or proximate to the display surface. Further details of edge lighting rails 100 and 100' are provided below. The infrared light produced by the IR sources may:

exit through the table surface without illuminating any objects;
illuminate objects on the table surface; or
illuminate objects a short distance above the table surface but not touching the table surface, as indicated by dash line 78c.

If translucent layer 64b is employed on the top of the display surface to diffuse the IR light passing through the display surface, as an object approaches the top of display surface 64a, the amount of IR light that is reflected by the object increases to a maximum level that is achieved when the object is actually in contact with the display surface. In applications in which it is not necessary to detect objects until they are actually in contact with the display surface, it will be apparent that translucent layer 64b can be omitted, which will improve the sharpness with which touch objects actually in contact with the display surface are imaged using the IR light provided by edge lighting rails 100 and 100'.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or
reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
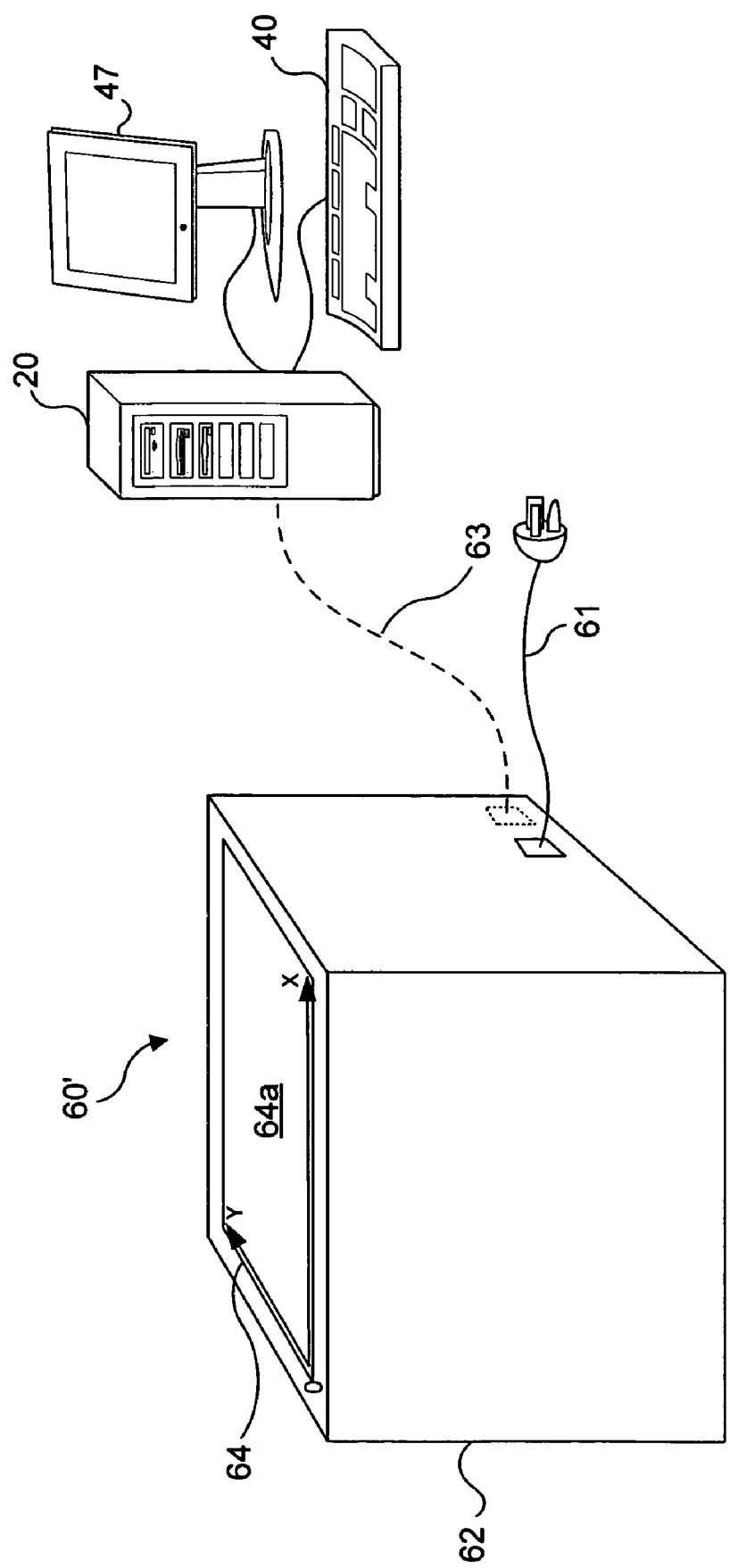
FIG. 3 is an isometric view of an interactive display table coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as a touch object 76a, or are hovering just above it, such as a hover object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCOS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light along a path 82b onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

Details of the Edge Lighting System

Figure 4:
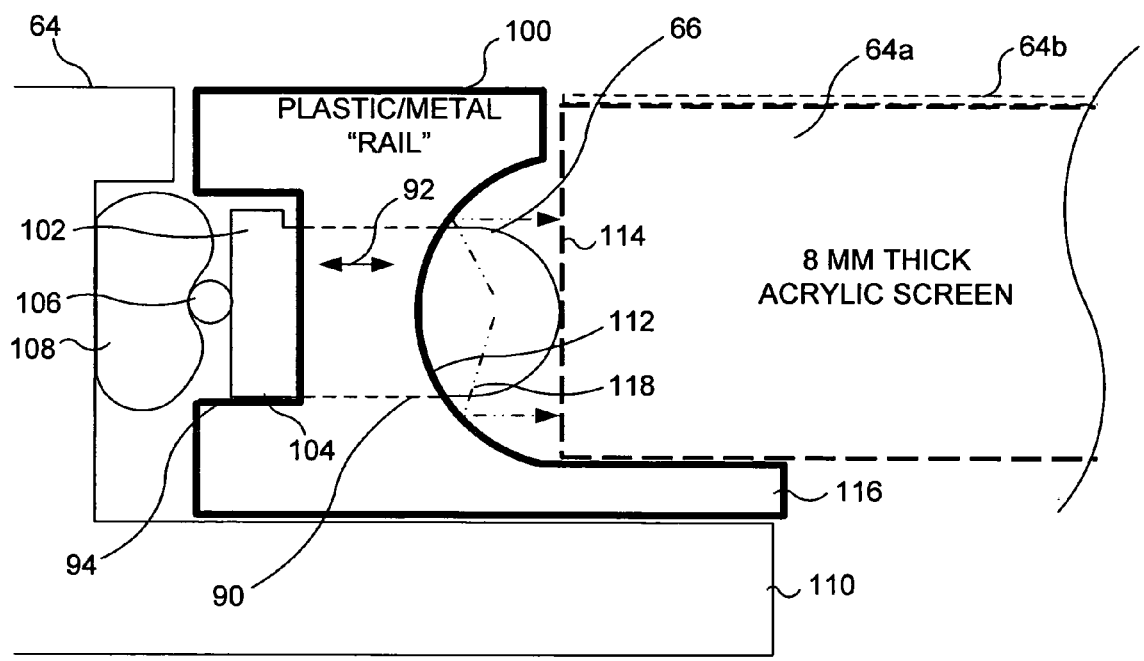
FIG. 4 is a cross-sectional side elevational view of an embodiment of the edge lighting system in accord with the present invention, showing how the edge lighting system is disposed relative to a surrounding perimeter of a display support and a display surface.
Figure 5:
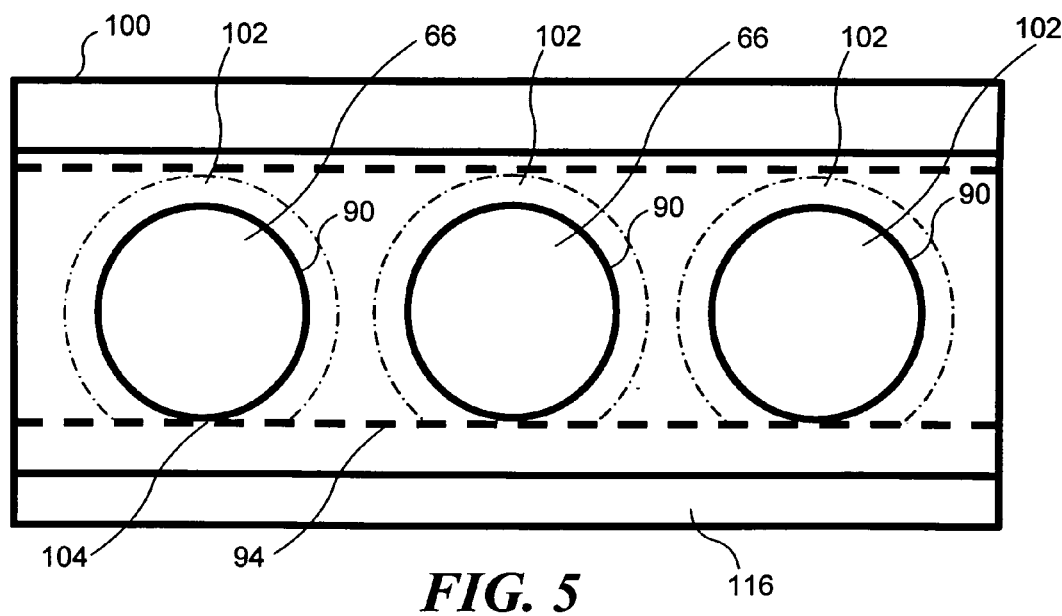
FIG. 5 is a front elevational view of a portion of an edge light system and a plurality of LEDs mounted therein.

FIGS. 4 and 5 illustrate details of one preferred embodiment of an edge lighting system in accord with the present invention. As illustrated in the cross-sectional view in FIG. 4, the edge lighting system includes a plastic or metal rail 100. A plurality of orifices 90 are formed at spaced-apart intervals within rail 100, as shown more clearly in a short section of the rail illustrated in FIG. 5. One of the plurality of LEDs 66 is inserted into each orifice 90. Clearance is provided around each LED, since the diameter of the orifice is slightly greater than that of the LED, sufficient to enable the LED to move freely longitudinally, as indicated by an arrow 92. Longitudinal movement of each LED 66 toward an edge 114 of display surface 64a is limited only by a base 102 of the LED, which extends radially outward to an extent greater than the diameter of orifice 90. However, when mounting the rail adjacent to edge 114, care is taken to limit the clearances so that base 102 does not contact the rail before the front of the LED contacts the edge of the display surface.

A flat 104 along one side of base 102 serves as a key to determine the rotational orientation of each LED within orifice 90, since the flat interacts with a surface 94 on rail 100. As will be evident from the detailed description of the electrical circuit for interconnecting the LEDs set forth below, it is important that the LEDs all be oriented in the same rotational disposition within orifices 90, and flat 104 ensures that all LEDs 66 can only be inserted into orifices 90 in the same relative rotational disposition.

An important feature of this edge lighting system is that all LEDs 66 are individually and separately urged into contact with edge 114 of display surface 64a, which ensures that light emitted by the LEDs is transmitted into display surface 64a with a uniform intensity without the need for coupling fluids, gels, or oils. Since LEDs 66 are free to move longitudinally within orifices 90, it is important that each of the LEDs be biased toward edge 114 and into contact with the edge. Accordingly, an elastomeric member 108 is disposed between an adjacent surface of the surrounding portion of the interactive table and the rear of each base 102 (i.e., a lead 106 on the base). Elastomeric member 108 preferably comprises an elongate strip of rubber or a similar elastomeric material that exerts a restoring force when compressed. This restoring force developed by the elastomeric material comprising elastomeric member 108 thus biases each LED 66 individually into direct contact with edge 114. In contrast to surface mounted light sources that are rigidly mounted on a printed circuit board that does not permit movement of each LED separately toward an adjacent display surface edge, LEDs 66 are all separately biased into contact with edge 114 and therefore, more efficiently transfer light into display surface 64a.

While not required, in this exemplary embodiment, rail 100 also includes a concave surface 112, preferably formed as a parabola. The front of each LED 66 extends sufficiently beyond concave surface 112, so that a light emitting portion (not specifically shown) of each LED 66 is generally disposed at a focal point of the parabola As a result, light emitted by the LED in any direction away from edge 114 is reflected back into the edge, as indicated by a line 118 in FIG. 4.

Rail 100 is preferably formed from a metal such as aluminum that has a relatively highly light reflective surface. Alternatively, the rail can be extruded from a plastic material to which a reflective coating is preferably applied on concave surface 112. Orifices 90 are either punched or drilled through rail 100 at the desired spaced-apart intervals along the length of the rail. In the illustrated example of FIG. 4, the bottom of rail 100, which includes a lip 116 to support display surface 64a rests on a shelf 110 formed in the frame of the interactive table.

Edge 114 of display surface 64a in one embodiment has a "diamond" polish, so that light directed into the edge readily enters the material comprising the display surface. In this preferred embodiment, the material comprising display surface 64a is a special acrylic plastic specifically designed to efficiently internally reflect light transmitted into the edge and uniformly emit light through the display surface. A suitable acrylic plastic of this type is available from Atofina, under the trademark ELIT™, and from Cyro Industries under the trademark GS-1002™. A particular characteristic of this material, in addition to its efficient internal reflectance of light transmitted into its edge, is that the light being internally reflected is emitted through the surfaces rather uniformly. Thus, as noted above in regard to FIG. 2, IR light emitted by LEDs 66 exits display surface 64a and illuminates objects 76a and 76b, and is then reflected from these objects back through the surface and received by IR video camera 68. More specifically, when object 76a either approaches display surface 64a, or approaches translucent layer 64b, the IR light that is being internally reflected within the acrylic plastic material comprising the display surface is uniformly emitted and illuminates the undersurface of the object.

Figure 6:
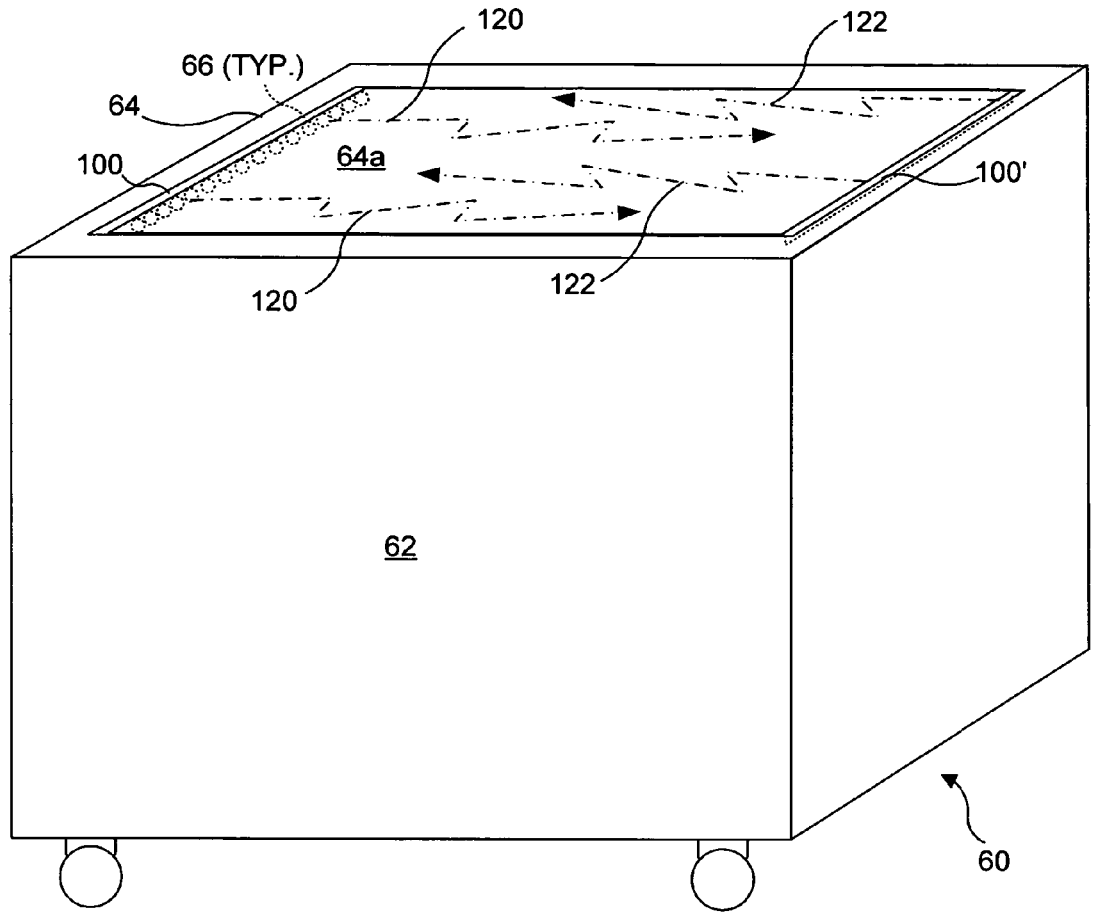
FIG. 6 is an isometric view of the interactive table with the edge light system providing illumination that is generally conveyed as internally reflected light within a display surface.

As shown in FIG. 6, the edge lighting system used with interactive table 60 preferably employs rail 100 along one side and a rail 100' along an opposite side of display surface 64a. Rail 100' also includes a plurality of LEDs 66 (although not shown in this Figure) that are disposed at spaced-apart intervals along the length of the rail. These LEDs disposed in rails 100 and 100' emit non-visible IR light that is transmitted into the opposite edges of display surface 64a and is internally reflected within the acrylic plastic comprising the display surface, as indicated schematically by lines 120 and 122 in FIG. 6. Although this embodiment uses two such rails at opposite sides of the display surface, it should be apparent that in some applications of the present invention, only a single rail disposed along one side may be sufficient to provide the light for illuminating objects contacting a display surface, particularly if the display surface is somewhat smaller in area. Similarly, in other applications, it may be appropriate to use more than two rails disposed along more than two edges of a display surface to provide the desired level of illumination.

An important consideration in regard to interactive table 60 is that the light illuminating objects are in contact with or proximate to display surface 64a be substantially uniform over the entire display surface. Since edge lighting rails are disposed on the two opposite sides of the display surface, it has been empirically determined that a more uniform illumination can be achieved by spacing LEDs 66 more closely together at the ends of rails 100 and 100' than in the centers of these rails. In an exemplary fashion, FIGS. 7A and 7B clearly illustrate the different spacing between LEDs 66 that are disposed along the length of each rail. In addition, it should be apparent from these Figures that a different number of LEDs 66 are mounted on rail 100 than on rail 100'. It was also empirically determined that the LEDs should be more closely spaced on rail 100, because it is farther from IR video camera 68 than rail 100'. In a preferred embodiment of this invention used with interactive table 60, a total of 96 LEDs 66 are included in the two rails, and rail 100 includes 52 LEDs, while rail 100' includes only 44 LEDs.

FIGS. 7A and 7B illustrate the rear of bases 102 and show the series/parallel circuit arrangement used for interconnecting the LEDs. Interconnected leads 122 are soldered together to join adjacent LEDs that are serially connected. On rail 100, one end of a lead 126a is connected to a negative terminal of a direct current (DC) power supply (not shown in these Figures), and it's opposite end is connected to the cathode of the first LED at the right end of the rail. Similarly, a lead 126b connects the negative terminal of the DC power supply to the cathode of another LED 66. The positive terminals of the DC power supplies are connected through leads 124a and 124b to the anodes of two other LEDs. In a similar fashion, the negative terminals of the DC power supplies are connected via leads 130a and 130b to the cathodes of LEDs on rail 100', while the positive terminals of the DC power supplies are connected to the anodes of two other LEDs by leads 128a and 128b.

In regard to the embodiment of the present invention used on interactive table 60, the serial/parallel interconnection of the 96 LEDs to a power supply 140 is illustrated in FIG. 8. The positive terminal of the DC power supply is connected through a lead 142 to one side of each of eight (optional) current regulators 144, and each current regulator is connected in series with 12 LEDs 66, which are connected in series with each other. The cathode of the twelfth LED in each group of series connected LEDs is connected through a lead 146 to the negative terminal of power supply 140. Thus, eight groups of 12 serially connected LEDs are coupled in parallel with each other and are energized with the electric current provided by the power supply.

Although a preferred embodiment of this invention that is used in connection with interactive table 60 employs LEDs that emit only IR light, it is also contemplated that LEDs emitting only UV light could instead be employed. In this case, a UV sensitive video camera would be employed to detect light reflected from a touch object or a hover object that is respectively in contact with or proximate to display surface 64a. Furthermore, although the interactive table employs only non-visible light to illuminate and detect objects placed on or adjacent to the display surface, it will be apparent that the present invention is also applicable to providing uniform illumination of a surface with visible light emitted by LEDs or other appropriate lights sources that can be urged into contact with the edge of the display surface. Accordingly, the present invention is not limited only to providing illumination of a surface with non-visible light.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An edge lighting system comprising:
   (a) a plurality of light sources that are electrically coupled into an electric circuit so that the light sources can be energized with an electrical current;
   (b) an elongate support having a plurality of orifices formed therein at spaced-apart locations along a length of the elongate support, each of the plurality of orifices being sized to receive and support a different light source from the plurality of light sources to define a generally linear array, each of the plurality of light sources being inserted through the orifices and being free to move within the orifice, a front portion of each light source extending outwardly from the elongate support; and
   (c) an elastomeric member that is disposed behind a rear portion of each of the plurality of light sources, said elastomeric member providing a force directed against the rear portion of each of the plurality of light sources that are free to move within the orifice into which the light source is inserted, to bias the front portion of each of the plurality of light sources against an edge into which the light emitted by the light source is directed.

2. The edge lighting system of claim 1, wherein the plurality of light sources comprise a plurality of light emitting diodes (LEDs).

3. The edge lighting system of claim 2, wherein the plurality of LEDs each emit a non-visible light.

4. The edge lighting system of claim 2, wherein the plurality of LEDs each emits light that is in one of an infrared (IR) light waveband and an ultraviolet (UV) light waveband.

5. The edge lighting system of claim 1, wherein elongate support includes a concave curved surface beyond which the front portion of each of the plurality of light sources extends, said concave curved surface serving to reflect light emitted by the plurality of light sources into an edge contacted by the front portion of each of the plurality of light sources.

6. The edge lighting system of claim 1, wherein the plurality of orifices are spaced more closely together along at least one portion of the elongate support than along at least one other portion of the elongate support.

7. The edge lighting system of claim 1, wherein the elastomeric member comprises an elongate strip of elastomeric material that extends along the length of the elongate support member and is disposed between an adjacent surface and the rear portion of the plurality of light sources, said elastomeric material being compressed when disposed between the adjacent surface and the rear portion of the plurality of light sources to develop the force that biases each of the plurality of light sources toward an edge into which the light emitted by the light source is directed.

8. A method for lighting an edge of a light conductive sheet, comprising the steps of:
(a) mounting a plurality of light sources in an elongate support so that each of the plurality of light sources is free to move toward the edge relative to the support, and so that the plurality of light sources are disposed to emit light directed into the edge of the light conductive sheet;
(b) biasing each of the plurality of light sources, so that each light source is separately urged to move toward and into contact with the edge of the light conductive sheet; and
(c) enabling the plurality of light sources to be energized to emit light that is directed into the edge of the light conductive sheet.

9. The method of claim 8, wherein the step of mounting comprises the step of inserting each of the plurality of light sources into a different orifice of a plurality of orifices formed in the elongate support, so that each light source is free to move within the orifice into which it has been inserted and so that a front portion of the light source extends beyond an adjacent surface of the elongate support.

10. The method of claim 9, wherein the elastomeric member comprises an elastomeric material formed into an elongate strip, further comprising the step of mounting the elongate support adjacent to a surface, with the elastomeric member disposed and compressed between the surface and a rear portion of the plurality of light sources, so that compression of the elastomeric material produces the force directed against each of the plurality of light sources.

11. The method of claim 8, further comprising the step of reflecting light emitted by the plurality of light sources from an adjacent surface of the elongate support into the edge of the light conductive sheet.

12. The method of claim 8, wherein the step of biasing comprises the step of providing an elastomeric member behind each of the plurality of light sources to produce a force directed against each of the plurality of light sources, said force urging the plurality of light sources separately to move relative to the elongate support and into contact with the edge of the light conductive sheet.

13. The method of claim 8, wherein the light emitted by the plurality of light sources is within a non-visible waveband.

14. The method of claim 13, wherein the non-visible waveband comprises one of an infrared (IR) waveband and an ultraviolet (UV) waveband.

15. The method of claim 8, further comprising the step of spacing at least some of the plurality of light sources closer together than another portion of the plurality of light sources.

16. An edge lighted system, comprising:
(a) a sheet of light conductive material that conveys light by internal reflections between two opposed surfaces, the light being emitted from the sheet through the two opposed surfaces in a generally uniform manner; and
(b) an edge lighting assembly disposed adjacent an edge of the sheet of light conductive material, the edge lighting assembly comprising:
(i) a plurality of light sources that are electrically connected in an electric circuit so that the light sources can be energized with an electrical current;
(ii) an elongate support having a plurality of orifices formed therein at spaced-apart locations along a length of the elongate support, each of the plurality of orifices being sized to receive and support a different light source from the plurality of light sources to define a generally linear array, each of the plurality of light sources being inserted through the orifices and being free to move within the orifice, a front portion of each light source extending outwardly from the elongate support; and
(iii) an elastomeric member that is disposed behind a rear portion of each of the plurality of light sources, said elastomeric member providing a force directed against the rear portion of each of the plurality of light sources, to bias the front portion of each of the plurality of light sources into contact with the edge of the light conductive sheet into which the light emitted by the light source is directed.

17. The edge lighted system of claim 16, wherein the plurality of light sources comprises a plurality of light emitting diodes (LEDs).

18. The edge lighted system of claim 17, wherein the plurality of LEDs emit light within a non-visible waveband.

19. The edge lighted system of claim 17, wherein the plurality of LEDs emit light within one of an infrared (IR) and an ultraviolet (UV) waveband.

20. The edge lighted system of claim 16, wherein the sheet of light conductive material comprises an acrylic plastic.

21. The edge lighted system of claim 16, wherein the elongate support includes a concave surface that is disposed adjacent to the edge of the sheet of the light conductive material, the concave surface reflecting light emitted by the plurality of light sources into the edge of the sheet of light conductive material.

22. The edge lighted system of claim 16, wherein the elastomeric member comprises an elastomeric material that is shaped like a strip and is compressed between a rear portion of each of the plurality of light sources and an adjacent surface, compression of the elastomeric material producing the force that urges each of the plurality of light sources separately into contact with the edge of the sheet of light conductive material.

23. The edge lighted system of claim 16, further comprising at least one other edge lighting assembly that is disposed along a different edge of the sheet of light conductive material, said at least one other edge lighting assembly being substantially similar to the edge lighting assembly as defined in claim 16.

24. The edge lighted system of claim 23, wherein said at least one other edge lighting assembly includes a different number of light sources than comprise the plurality of light sources in the edge lighting assembly as defined in claim 16.

25. The edge lighted system of claim 16, wherein the plurality of light sources are spaced at different intervals along the elongate support.

26. The edge lighted system of claim 25, wherein portions of the plurality of light sources are more closely spaced adjacent to each end of the elongate support than at a center of the elongate support.

* * * * *